Oct. 6, 1959 L. D. MASSER 2,907,579
AXLE MOUNTING FOR RUNNING GEAR FOR AUTOMOTIVE VEHICLES
Filed June 13, 1956 3 Sheets-Sheet 2

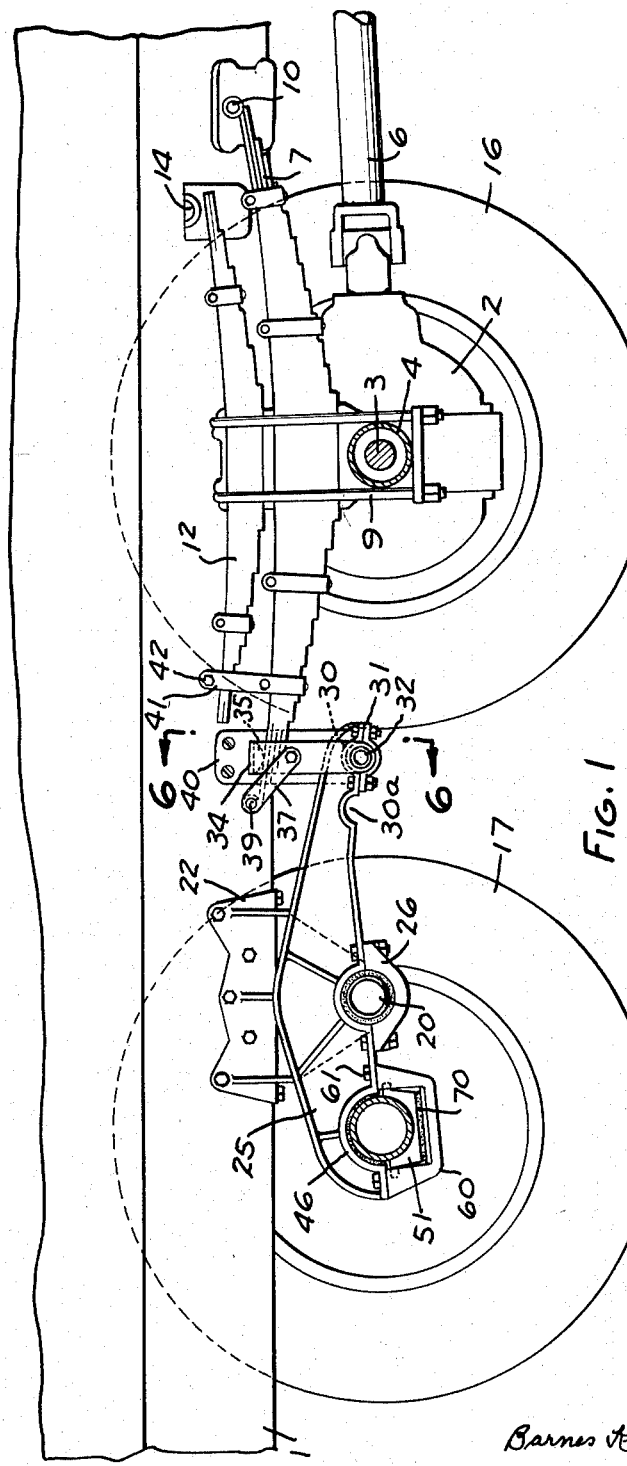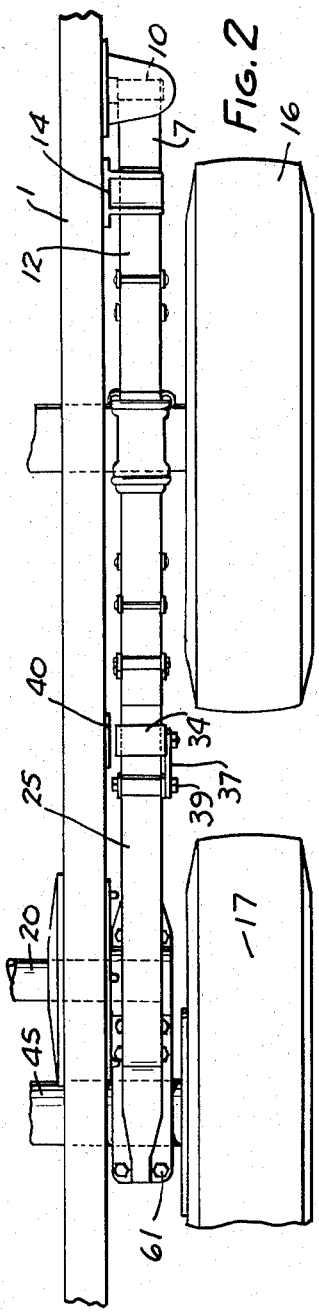

INVENTOR.
LLOYD D. MASSER
BY
Barnes Kisselle Laughlin & Raisch
ATTORNEYS.

Oct. 6, 1959     L. D. MASSER     2,907,579
AXLE MOUNTING FOR RUNNING GEAR FOR AUTOMOTIVE VEHICLES
Filed June 13, 1956     3 Sheets-Sheet 3
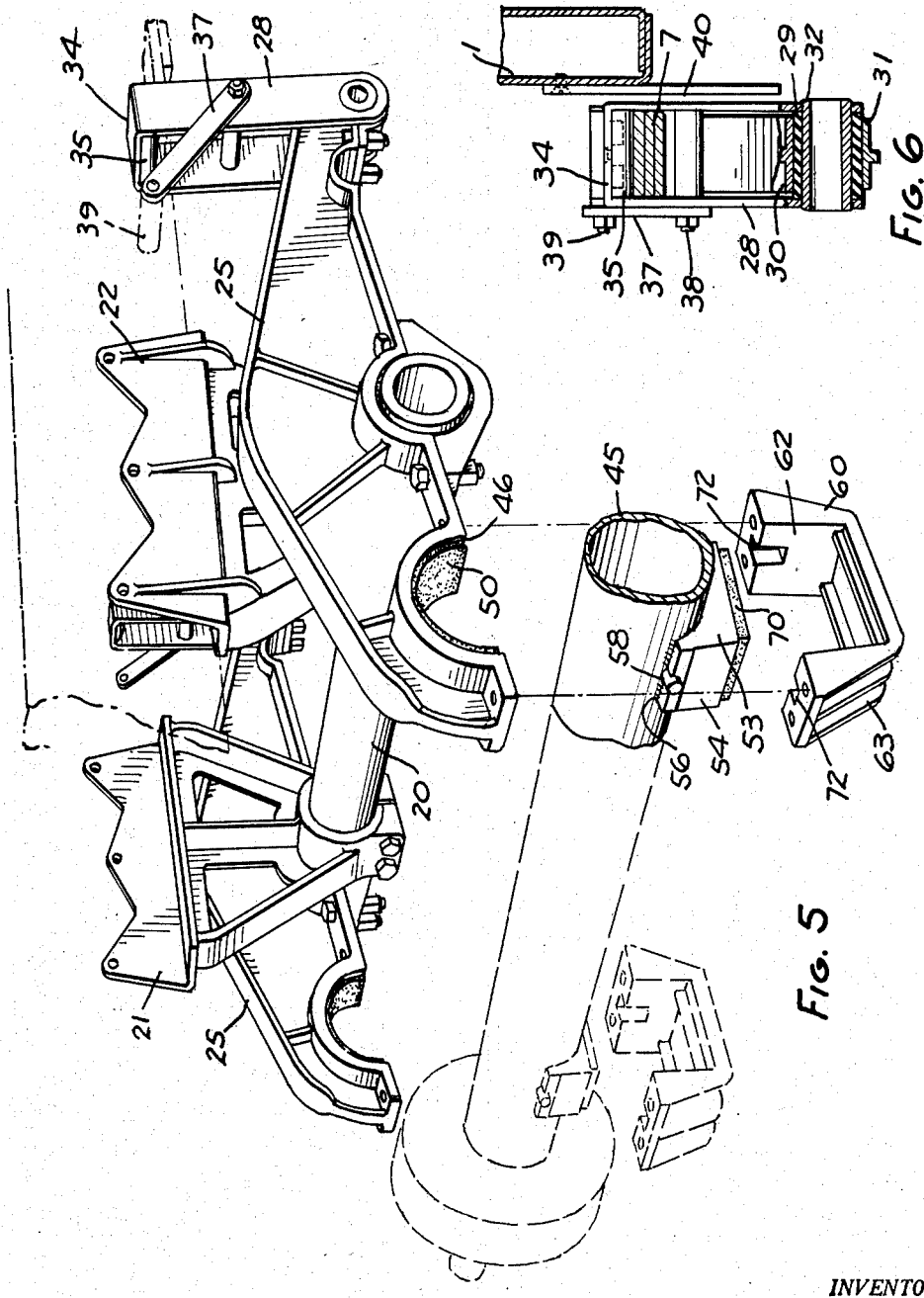
INVENTOR.
LLOYD D. MASSER
BY
ATTORNEYS.

United States Patent Office 2,907,579
Patented Oct. 6, 1959

2,907,579

AXLE MOUNTING FOR RUNNING GEAR FOR AUTOMOTIVE VEHICLES

Lloyd D. Masser, Muskegon, Mich., assignor to Neway Equipment Company, Muskegon, Mich., a corporation of Michigan Application June 13, 1956, Serial No. 591,232

10 Claims. (Cl. 280—124)

This invention relates to running gear for automotive vehicles and particularly to commercial vehicles. More especially the invention is concerned with construction in running gear for trucks and trailers of the type for carrying heavy loads. It may be said that the invention is concerned with heavy duty equipment although such term is relative and the invention may be employed on equipment which by some definitions may not be considered as heavy duty equipment.

The invention is more particularly concerned with an axle mounting. The axle mounting may be employed where multiple axles are used, such as in the so-called tandem unit, and it may be employed as a single axle.

In multiple axle running gear, such as a two-axle tandem assembly, a number of problems present themselves. There must be sufficient flexibility to accommodate uneven terrain so that all the wheels may, at all times, except perhaps for very exceptional instances, stay on the ground allowing the frame of the vehicle to remain adequately stable. This should be done without throwing undue stress and strain on other parts. Another problem which presents itself is the absorption of brake torque. This problem is particularly difficult in a tandem axle assembly. The application of the brakes results in tremendous kinetic energy effort which attempts to lift the rear axle off the ground thus imposing a correspondingly increased load on the front axle. In this action, with less load on the rear axle, the brakes may become locked, and then upon deceleration, the rear axle falls back, so to speak, and its locked wheels strike the ground. Immediately the axle is kicked back up again and the repeated action is violent and sometimes referred to as a "crowhopping" action.

An object of this invention is to provide an axle mount structure which provides sufficient flexibility so that the axle may articulate adequately to accommodate for uneven road characteristics so that all wheels may remain on the ground, and to take up energy upon the application of the brakes, in such a manner as to eliminate "crowhopping" characteristics.

The axle mount of this invention may be associated with the vehicle through various types of spring means such as the usual spring stack, or through the means of the so-called air spring which embodies a chamber filled with air under pressure. Selected for disclosure herein is a tandem axle arrangement which employs devices commonly termed walking beams.

Fig. 1 is a view partly in elevation and partly in section showing a tandem axle arrangement with the axle mount of this invention, the near wheels being removed to show the suspension structure.

Fig. 2 is a plan view with the rear wheels applied.

Fig. 5 is an exploded view of the axle and walking beam assembly.

Fig. 6 is a sectional view taken on line 6—6 of Fig. 1 showing connections for the walking beam.

Figure 3:
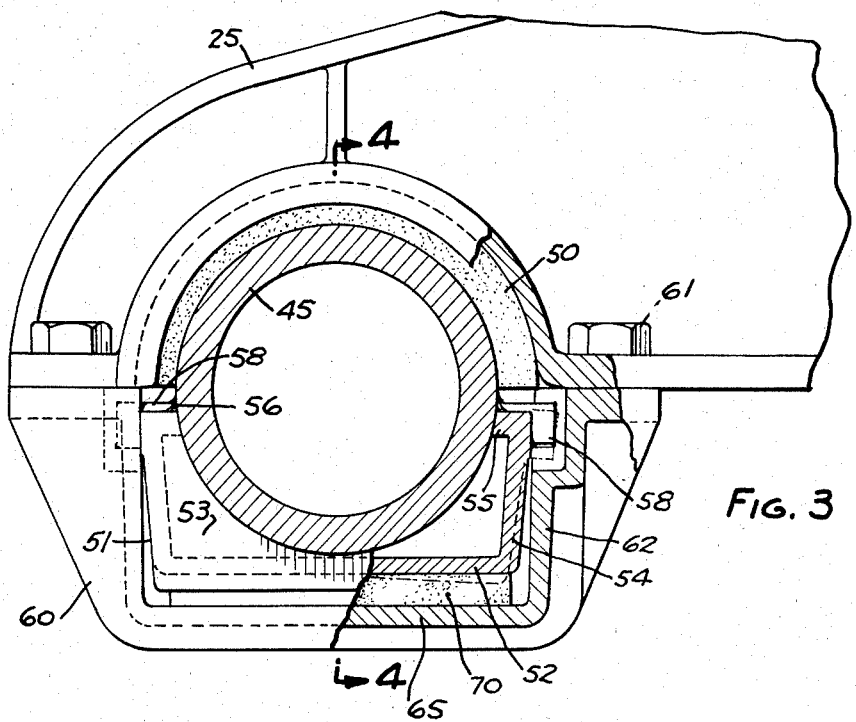
Fig. 3 is an enlarged cross sectional view taken transversely to the axis and illustrating axle parts and mounting parts.

The frame of an automotive vehicle which hereinafter may be referred to as a truck is illustrated at 1 and the truck has a live axle with a housing 2. The drive shaft of the axle is illustrated at 3 contained within the axle housing part 4. A drive shaft is illustrated at 6. The frame is supported by springs, one adjacent each side of the frame. Such a sring is illustrated at 7 and is mounted on the axle by suitable U-bolts 9. The forward end of the spring is connected to the frame as at 10. There is an auxiliary spring 12 arranged to come into play when an adequate load causes the abutment 14 to strike the end of the spring. The wheels for the live axle are illustrated at 16 and for the trailing axle at 17. The association of the rear ends of the springs 7 and 12 with the truck frame has not been described as yet because this has been modified by the attachment of the walking beam type of mounting for a tandem axle to be described.

There is a cross shaft 20 (Fig. 5) mounted in brackets 21 and 22. The brackets are mounted to opposite sides of the frame and the cross shaft 20 extends transversely. Rockably mounted on the cross shaft are two walking beams each indicated at 25. Since the walking beams are the same only one need be described. Each walking beam is rockably mounted on the cross shaft, preferably through the means of a rubber bushed bearing and is secured thereto by a cap 26. There is a link or yoke 28 pivotally connected to the forward end of the walking beam. For this purpose, the walking beam is provided with an inverted recess 30 closed by a cap 31 thus providing a bearing for a bearing member 32 preferably rubber bushed as at 29 (Fig. 6).

The link or yoke 28 may be formed from a suitably fashioned metal plate having a bight portion 34 which overlies the rear end of the spring 7. This bight portion may have a fillet 35 for resting upon the spring 7. A link 37 is pivotally connected to the yoke 28 at 38 and has a pivotal connection 39 in the eye at the rear end of the spring 7. Thus, the vertical load at the forward end of the walking beam hangs dependently from the rear end of the spring 7. The distance of the point of contact of the fillet 35 with the spring from the pivotal connection 39 at the end of the spring can be varied by varying the length of the link 37. This will be referred to later. A guard or guide 40 may be secured to the frame 1 to lie between the frame and the yoke and spring structure, as shown in Fig. 6. A clevis type of device 41 is secured to the spring 7 and a cross bolt 42 extends over one end of the spring 12. The bolt 42 is normally spaced from the upper surface of the spring 12 corresponding to the spacing of the abutment 14 with respect to the opposite end of the spring. When the spring 7 is flexed under heavy load the bolt 42 engages spring 12, the same as does the abutment 14.

Figure 4:
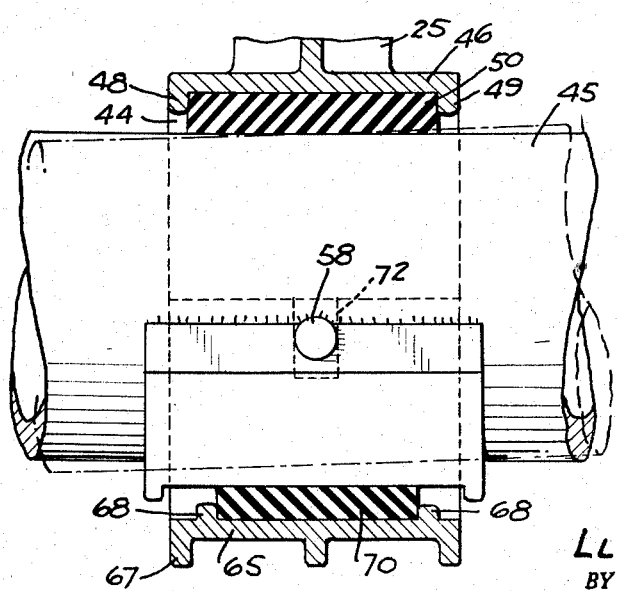
Fig. 4 is an enlarged sectional view taken on line 4—4 of Fig. 3.

The trailing axle is connected to the rear ends of the walking beams. As shown herein the trailing axle is cylindrical in form and, indeed, is tubular. However, the axle may be of other cross sectional shapes such as square or of I beam form. The axle is indicated at 45 and the walking beam has a substantially semi-cylindrical formation at its rear end as indicated at 46. This formation is of grooved form having a flange 48 and a flange 49. A body of rubber 50 semi-circular in form is placed in the groove for receiving the axle, as shown in Figs. 3 and 4. The interior diameter of the rubber bearing member 50 is preferably such as to fit the outside diameter of the axle 45 but the flanges 48 and 49 are spaced from the axle as shown at 44.

An element 51 which may be called an axle adapter and which is preferably a steel casting is permanently secured to the axle on the underside thereof. This adapter, as shown in Figs. 3, 4 and 5, is preferably of hollow form. It is provided with a bottom wall 52 which is non-concentric with respect to the axis of the axle, and is advantageously flat. The adapter also has side walls 53 and end walls 54. The side walls are preferably perpendicular to the bottom wall, the end walls 54 may be perpendicular or slightly angular as illustrated in Fig. 3. The side walls 53 have upper edges which are arcuately shaped to fit the axle 45 and the end walls 54 are provided with flanges 55. This adapter is permanently secured to the axle to form a part thereof, as by means of welding the flanges 55 and the upper edges of the walls 53 to the axle as shown at 56. Integrally formed with this adapter are oppositely disposed projections or pins 58. These extend respectively forwardly and rearwardly.

A cap or housing 60 encloses the adapter and the underside of the axle, and is secured to the walking beam as by means of cap screws 61. This cap or housing has upstanding side walls 62 preferably, reinforced with integrally formed ribs 63, and a bottom wall 65. This bottom wall is non-concentric relative to the axle and is advantageously flat. The bottom wall 65 is preferably also reinforced by ribs 67. The bottom wall is provided with ribs 68 and disposed on the bottom wall within the ribs is a body or block of resilient material, such as rubber 70. When various elements are referred to as being of rubber it is to be appreciated that the term rubber is used in a broad sense and includes natural or synthetic rubber or elastic plastics which are the equivalent thereof. The cap 60 is provided with notches or ways 72 for accommodating the projections 58. The parts fit together, as shown in Figs. 3 and 4, with the axle 45 snugly engaged in the rubber bearing or bushing 50 and with the bottom 52 of the adapter snugged against the rubber body 70. The adapter fits within the cap 60 with clearance between its end walls 54 and the upstanding walls 62 of the cap and the pins or projections 58 fit nicely into the slots 72. The projections may move in the slots with a vertical component but are held against lateral movement.

In use of the particular running gear structure shown, the frame is yieldably supported. Considering that the rear wheels 17 exert an upward force on the axle 45 in supporting the load, the walking beams are rocked about the axis 20 so that the forward end of the walking beams pull downwardly on the rear ends of the springs 7. The front wheels 16 exert an upward force which is divided and some of which passes directly into the frame through the connection 10 and some of which upward force at the rear end of the springs 7 balances the downward load exerted by the walking beams. The walking beams, as shown, are not equally balanced levers, since the forward arms thereof are longer than the rearward but the downward load exerted on the spring 7 is forward of the eye of the spring 7. In other words, the load is applied where the fillet 35 engages the spring 7. The walking beam may have one or more notches at 30a so that the arrangement may be varied by connecting the hanger 28 in the notch 30a instead of the notch 30. The point where the load of the hanger is applied to the spring 7 may be varied by the simple expedient of varying the length of the link 37. The link 37 carries no load but serves to position the point where the load is applied by the hanger.

As the vehicle operates, the walking beams articulate to accommodate uneven road conditions. This embodies a rocking movement about the shaft 20. Of course, the wheels 17 on opposite sides of the vehicle are not always subjected to the same uneven road characteristics. One wheel may be high while the other is low. This movement is permitted by the flexing of the rubber mountings as indicated in Fig. 4 where the laterally inclined position of the axle 45 is shown in dotted lines. The rubber bearing 50 and the rubber pad 70 flex to permit such movement. At the same time, however, the walking beams remain substantially in their normal planes with respect to the vertical plane of the vehicle frame. Thus, one wheel 17 may drop into a recess or ride over a raised part or hummock in a road with all other wheels remaining on the ground. It has been found that this construction provides, for example, for a rise of one wheel with respect to the others in the tandem mounting which is in excess of present requirement specifications for some vehicles of this type. The projections 58 articulate in their guideways 72 and hold the axle 45 in true transverse position.

When the brakes are applied the brake reaction torque throws tremendous kinetic energy forces into the construction which tends to lift the rear axle off the ground. This may result in locking the wheels 17, and upon deceleration, as the wheels 17 exert more load on the ground, the wheels 17 are kicked back up again, and a recurrence of this is the "crowhopping" action above referred to. The rubber mounting, particularly the mounting 70, provides for an energy takeup or for the absorbing of such energy when the brakes are applied. These forces tend to turn the axle on its axis as indicated by the dotted lines in Fig. 3. However, the square bottom of the adapter 51 engages the rubber pad or block 70 and while some rocking is permitted, there is a gradual absorption of the energy and tests have indicated that the crowhopping action is eliminated. In this action the projections or pins 58 articulate or slide, so to speak, in the ways 72 and thus while energy is absorbed by the yielding rubber mounts the axle is retained in its true transverse position. Rocking of the axle and adapter, as indicated in Fig. 3, is also permitted by the semi-circular rubber bearing or bushing 50 and one of two things or both may occur. The axle 45 may rock on the facing of the bushing 50 to some extent and then the material of the bushing may flex. The accommodation of road irregularities which is accompanied by transverse rocking of the axle, as one wheel may be high and the other low, may occur simultaneously with the rocking on its axis in absorbing kinetic energy incident to the torque of brake reaction.

As mentioned above the axle mounting, as shown in Figs. 3 and 4, that is, the mounting for the axle 45 may be employed in constructions other than those which use the walking beam type of assembly. In such a construction the axle assembly 45 with its adapter and cap construction may be associated with the frame of the vehicle by mechanical springs or the so-called air or pneumatic spring. Moreover, the axle mounting may be used in connection with a live axle for torque absorption as will be obvious from a consideration of the drawings and may be used as a mounting for cross shaft or trunnion 20. The term "axle" as used in the claims is intended to include both live and dead axles and other shafts in a suspension structure such as shaft 20.

I claim:

1. An axle structure for ground engaging wheels of a vehicle of the type for operating over roadways and the like, comprising, an axle adapted to be positioned transversely of the vehicle for receiving ground engaging wheels at its opposite ends, mounting means adapted to be secured adjacent each side of the vehicle having means for partially receiving the axle, adapter members fixed to the axle and projecting laterally therefrom, each adapter member having a substantially flat surface the plane of which is removed from the axis of the axle, cap members secured to the mounting means and each having a flat surface in proximity to the flat surface of the respective adapter member, each adapter member fitting in the respective cap member with clearance so that it has limited rocking movement substantially about the axis of its axle, and a body of rubber between the flat surfaces of each adapter member and cap member which yields to provide such rocking movement, each cap member having a vertically disposed slot positioned substantially on opposite sides of the axle, each adapter member having lateral projections slidably fitting in the slots and serving to hold the axle against axial displacement.

2. An axle structure for ground engaging wheels of a vehicle of the type for operating over roadways and the like comprising, an axle adapted to have ground engaging wheels at opposite ends, means adapted to be secured to the vehicle on opposite sides thereof, a semicircular rubber bearing member in each said means, the axle having portions for fitting in said rubber bearings, adapter members fixed to the axle and projecting laterally therefrom, each adapter member having a non-concentric surface removed from the axle axis, cap members secured to the said means and each positioned substantially opposite the said bearing member, each cap member having a surface in proximity to the surface of the respective adapter member, each adapter member fitting in the cap member with clearance so that it has limited rocking movement substantially about the axis of the axle, and a body of rubber positioned between the surfaces of the adapter members and cap members, whereby the axle member may rock on its axis with resultant yielding of the body of rubber, and each end of the axle may raise and lower relative to the opposite end by flexing of the rubber bearings and rubber bodies to accommodate road irregularities, and pin and slot connections between the axle and the said means for holding the axle against axial displacement.

3. An axle structure for ground engaging wheels of a vehicle of the type for operating over roadways and the like comprising, an axle adapted to have ground engaging wheels at opposite ends, means adapted to be secured to the vehicle on opposite sides thereof, a semi-circular rubber bearing member in each said means, the axle having portions for fitting in said rubber bearings, adapter members fixed to the axle and projecting laterally therefrom, each adapter member having a non-concentric surface removed from the axle axis, cap members secured to said means and each positioned substantially opposite the said bearing member, each cap member having a surface in proximity to said surface of the respective adapter member, each adapter member fitting in the cap member, with clearance so that it has limited rocking movement substantially about the axis of the axle, and a body of rubber positioned between the sufaces of the adapter members and cap members, whereby the axle member may rock on its axis with resultant yielding of the body of rubber, and each end of the axle may raise and lower relative to the opposite end by flexing of the rubber bearings and rubber bodies to accommodate road irregularities, and pin and slot connections between the axle and said means located forwardly and rearwardly of the axle and substantially on the axis thereof for holding the axle against axial displacement.

4. An axle structure for ground engaging wheels of a vehicle of the type for operating over roadways and the like comprising, an axle adapted to have ground engaging wheels at opposite ends, means adapted to be secured to the vehicle on opposite sides thereof, a semi-circular rubber bearing member in each said means, the axle having portions for fitting in said rubber bearings, adapter members fixed to the axle and projecting laterally therefrom, each adapter member having a non-concentric surface removed from the axle axis, cap members secured to said means and each positioned substantially opposite the said bearing member, each cap member having a non-concentric surface in proximity to the surface of the respective adapter member, each adapter member fitting in the cap member with clearance so that it has limited rocking movement substantially about the axis of the axle, and a body of rubber positioned between the surfaces of the adapter members and cap members, whereby the axle member may rock on its axis with resultant yielding of the body of rubber, and each end of the axle may raise and lower relative to the opposite end by flexing of the rubber bearings and rubber bodies to accommodate road irregularities, each cap member having a vertically extending slot, one forward of the axle and one rearward of the axle, each adapter member having a forward projection and a rearward projection, said projections fitting in the slots and movable therein substantially about the axis of the axle and serving to hold the axle against axial displacement.

5. An axle structure for ground engaging wheels of a road vehicle comprising, mounting means at each side of the vehicle provided with a substantially half bearing of rubber, an axle having portions fitting in said half bearings, adapter members secured to the axle and positioned to project therefrom in a direction opposite the half bearings, each adapter having a non-concentric surface, a cap member secured to each mounting means with the adapter member lying therein with clearance so that the axle may rock with the adapter member moving in the cap member, said cap member having a non-concentric surface positioned adjacent the surface of the adapter member therein, and a body of rubber positioned between said surfaces which yields upon said rocking action of the axle, each adapter member having a projection extending forwardly of the axle and a projection extending rearwardly of the axle, the projections being located approximately at the center line of the axle, each cap member having a slot for receiving a projection, the slots and projections being dimensioned so that the projections may slide in the slots as the axle rocks and the projections and slots holding the axle against axial displacement.

6. Axle structure for a vehicle comprising, an axle, mounting means adapted to secure said axle in load bearing relation to the vehicle, said axle including means providing a surface which extends transversely of and which is non-concentric with respect to the axis of said axle, said mounting means including means providing a surface in proximity to but spaced from said surface on the axle, said axle and mounting means being relatively rockable, resilient means in the space between said surfaces resisting relative rocking of said axle and mounting means, said axle and mounting means including means interengageable to secure said axle and mounting means against substantial relative movement axially of said axle, said interengageable means being free for relative movement within a limited range of rocking movement of said axle and mounting means, said interengageable means being interengageable at the limits of said range to secure said axle and mounting means against relative rocking movement beyond said range.

7. Axle structure for a vehicle comprising, an axle, mounting means adapted to secure said axle in load bearing relation to the vehicle, said axle and mounting means being relatively rockable about the axis of said axle, said axle and mounting means including means providing spaced apart but proximate surface portions whose relative angular attitudes change upon relative rocking movement of said axle and mounting means, resilient means between said surface portions resisting change of relative angular attitudes thereof, said axle and mounting means including means interengageable to secure said axle and mounting means against substantial relative movement axially of said axle, said interengageable means being free for relative movement within a limited range of rocking movement of said axle and mounting means, said interengageable means being interengageable at the limits of said range to secure said axle and mounting means against relative rocking movement beyond said range.

8. Axle structure for a vehicle comprising, an axle, mounting means adapted to secure said axle in load bearing relation to the vehicle, said mounting means having a semicircular rubber bearing member, said axle having a round portion fitting within said rubber bearing, an adapter member fixed to the axle and projecting laterally therefrom in a direction away from said bearing member, said adapter member having a surface removed from the axle axis and facing away from said bearing member, a cap member secured to the mounting means substantially opposite said bearing member, said cap member having a surface in proximity to but spaced from said surface of the adapter member, said axle being rockable about its axis relative to said mounting means and cap member, said surfaces having relative angular attitudes which change responsive to rocking of the axle about its axis, and resilient means between said surfaces resisting change of relative angular attitudes thereof.

9. Axle structure for a vehicle comprising, an axle, mounting means adapted to secure said axle in load bearing relation to the vehicle, said axle and mounting means being relatively rockable about the axis of said axle, said axle and mounting means including means interengageable to secure said axle and mounting means against substantial relative movement axially of said axle and means interengageable to limit the range of relative rocking movement of said axle and mounting means, said axle and mounting means including means providing spaced apart but proximate surface portions whose relative angular attitudes change upon relative rocking movement of said axle and mounting means, and resilient means between said surface portions resisting change of relative angular attitudes thereof.

10. Axle structure for a vehicle comprising, an axle, mounting means adapted to secure said axle in load bearing relation to the vehicle, said mounting means having a semi-circular rubber bearing member, said axle having a round portion fitting within said rubber bearing member, said axle including a portion projecting laterally in a direction away from said bearing member, said portion having a surface removed from the axle axis and facing away from said bearing member, a cap member secured to the mounting means substantially opposite said bearing member, said cap member having a surface in proximity to but spaced from said surface of said axle portion, said axle being rockable about its axis relative to said mounting means and cap member, said surfaces having relative angular attitudes which change responsive to rocking of the axle about its axis, and resilient means between said surfaces resisting change of relative angular attitudes thereof.

References Cited in the file of this patent

UNITED STATES PATENTS

| | | |
|---|---|---|
| 2,096,530 | Alden | Oct. 19, 1937 |
| 2,174,320 | Gonard | Sept. 26, 1939 |
| 2,637,569 | Turner | May 5, 1953 |

FOREIGN PATENTS

| | | |
|---|---|---|
| 889,217 | Germany | Sept. 7, 1953 |
| 411,622 | Great Britain | June 14, 1934 |